(12) United States Patent
Taylor

(10) Patent No.: US 6,283,556 B1
(45) Date of Patent: Sep. 4, 2001

(54) REVERSIBLE WHEEL WEIGHT FOR COUNTERBALANCING INDUSTRIAL AND AGRICULTURAL VEHICLES

(75) Inventor: Fredrick B. Taylor, Rome, GA (US)

(73) Assignee: F.B.T. Enterprises, Inc., Rome, GA (US)

( * ) Notice: Subject to any disclaimer, the term of this patent is extended or adjusted under 35 U.S.C. 154(b) by 0 days.

(21) Appl. No.: 09/441,406

(22) Filed: Nov. 16, 1999

(51) Int. Cl.⁷ .................................................. B60B 15/28
(52) U.S. Cl. ............................................................ 301/53.5
(58) Field of Search ........................... 301/53.5; 280/759, 280/217

(56) References Cited

U.S. PATENT DOCUMENTS

| | | |
|---|---|---|
| 1,263,643 | 4/1918 | Cassel . |
| 1,423,054 | 7/1922 | Walker . |
| 1,487,257 * | 3/1924 | Mansfield ............................ 301/53.5 |
| 2,108,346 | 2/1938 | Paul ...................................... 301/50 |
| 2,123,861 * | 7/1938 | Shields ................................ 301/53.5 |
| 2,150,107 * | 3/1939 | Shields ................................ 301/53.5 |
| 2,177,861 | 10/1939 | Burger ................................... 301/5 |
| 2,859,065 * | 11/1958 | Darby ................................... 301/53.5 |
| 2,988,401 * | 6/1961 | Matz .................................... 301/53.5 |
| 3,644,002 * | 2/1972 | Barth et al. ......................... 301/53.5 |
| 3,774,970 * | 11/1973 | Murphy et al. ...................... 301/53.5 |
| 4,417,651 | 11/1983 | Lu ........................................... 192/89 |
| 5,116,106 | 5/1992 | Hardesty et al. ...................... 301/41 |

\* cited by examiner

*Primary Examiner*—S. Joseph Morano
*Assistant Examiner*—Long Bao Nguyen
(74) *Attorney, Agent, or Firm*—Thomas, Kayden, Horstemeyer & Risley

(57) ABSTRACT

A reversible wheel weight (25) is used for counterbalancing an industrial vehicle, by attaching the weights directly to the wheel (10) of the vehicle. The wheels of industrial vehicles typically are dish-shaped so that they can be reversed on their mounting hubs so as to spread the wheels farther apart or closer together, as may be required for the working conditions. The reversible wheel weights of this invention are similarly shaped, having a dish-shaped annular weight body (28) defining an inner annular peripheral surface (32) and an outer annular peripheral surface (30) and openings (46, 64 and 76) for access to the lugs of the wheel, but having concave and convex opposed surfaces (34 and 36) for mounting to the convex or concave surfaces (16, 18) of the wheel of the vehicle. In addition, the concave/convex surfaces of the wheel weight correspond in shape so as to be nestable with one another, whereby multiple ones of the wheel weights can be mounted together and attached to the wheel of the vehicle.

2 Claims, 3 Drawing Sheets

REVERSIBLE WHEEL WEIGHT FOR COUNTERBALANCING INDUSTRIAL AND AGRICULTURAL VEHICLES

FIELD OF THE INVENTION

This invention relates to weights applied to the wheels of an industrial vehicle, to counterbalance a load applied to the other end of the vehicle. More particularly, the weights are adaptable for attachment to either the convex or concave surfaces of the wheel disk, with multiple ones of the weights being nested together to add more weight to the wheel, as may be necessary.

BACKGROUND OF THE INVENTION

During the use of certain industrial vehicles, there are times when an excessive weight is applied to one end of the vehicle, causing the other end of the vehicle to lift from the ground or lose traction with the ground. This becomes a hazardous situation for the vehicle operator and the personnel and equipment adjacent the vehicle. For example, if a scoop is attached to the front end of a tractor for lifting dirt, gravel, or other heavy materials, there are times when the operator will overload the scoop and when the scoop is raised by the tractor, the rear wheels of the tractor may lift away from the ground. This places the tractor in an unstable condition where the load is borne primarily by only the front wheels of the tractor. Likewise, when equipment is attached to the rear of a tractor, a similar situation can occur, when the load at the rear of the tractor causes the front, steerable wheels of the tractor to lift away from the ground, generating a similar undesirable situation for the vehicle and its operator.

In the past, it has become commonplace to add weights to the wheels of vehicles when it is anticipated that the wheels might lift away from the ground or if more weight is required by wheels for applying the proper traction between the wheel and the ground surface.

In some instances, wheels for industrial vehicles have a dish shaped wheel disk, convex on one side and concave on the other side. With this structure, the wheel can be reversed with respect to the hub, placing the tire closer to or farther away from the vehicle. This is sometimes used to adjust the spacing of the wheels closer to or farther away from each other, so as to be spaced in accordance with the spacing of rows of crops in a farmer's field, or to widen the stance of the vehicle to provide additional stability.

One of the problems encountered with the producers of wheel weights is that there are so many sizes and shapes of wheels, most with different lug spacing, that there is no "universal" wheel weight. Even the wheels of a single manufacturer vary so much in size and shape that different wheel weights must be produced for proper fitting against the different shaped disks of the wheels.

Therefore, it can be seen that there is a need for a universal wheel weight having different shaped opposed surfaces so that it is reversible for attachment to concave or to convex wheel disks, and with the formation of openings therein for attachment to a different lug pattern for the different wheels.

SUMMARY OF THE INVENTION

Briefly described, the present invention comprises a universal wheel weight, in which the wheel weight is formed with opposed concave and convex surfaces for mounting to either convex or concave wheel disks, respectively, of a wheel, with multiple patterns of openings for receiving the lug bolts which attach the wheel weight to the wheel disk.

The wheel weight includes a weight body formed in the shape of an annulus, defining a central axis, an inner annular peripheral surface or rim and an outer annular peripheral surface or rim. Opposed first and second lateral surfaces extend between the inner and outer peripheral surfaces, with one lateral surface being convex and the opposing lateral surface being concave. The weight body is shaped for nesting with duplicate ones of the weight bodies. The nesting of the bodies not only assists in storage and shipment of the weight bodies, but also permits the weight bodies to be laterally stacked on one another when attached to a wheel, so as to add more weight to the wheel, as may be required.

A first series of slots intersect the outer annular surface of the weight body and are formed in both the first and second opposed surfaces of the body, and are positioned at 90° intervals about the body and at equal radial distances from the axis of the weight body. Each of the slots in the first surface of the weight body are in alignment with one of the slots in the opposed second surface, and intermediate partitions remain between the slots, and connector openings are formed in the partitions.

A similar second series of slots are formed at 90° intervals about the weight body, with the slots defining intermediate partitions, and with connector openings formed in the partitions.

The slots of both the first and second series of slots provide a recess for the heads of the bolts that connect the weights to the wheel disks and that connect the wheel weights to each other when the multiple ones of the weights are stacked on a single wheel. The slots function to bring the heads of the bolts or lugs closer to the wheel disk and shield the heads of the lugs or bolts from contact with obstructions.

In addition to the aligned slots, partitions and connector openings through the partitions of the wheel weight body, a series of bores are formed in both the first and second opposed surfaces of the wheel weight body, with the bores on opposed surfaces of the wheel weight body being aligned with one another, with the bores positioned at 120° intervals about the wheel weight body and at equal radial distances from the axis of the wheel weight body. The bores are positioned radially inwardly of the slots, and partitions are formed between aligned ones of the bores, and connector openings are formed through the partitions. As with the slots, the bores place the heads of the lugs closer to the wheel and finction to shield the lugs from engagement with obstructions.

The concave and convex opposed surfaces of the wheel weight bodies are formed so that they substantially match each other for nesting purposes, both for storage and shipment as well for mounting multiple ones of the weights to a surface of a wheel disk. The fact that the weight bodies are convex on one side and concave on the other side allows the wheel weights to be added to either the convex or concave surface of the wheel of the vehicle.

Therefore, it is an object of this invention to provide an improved universal wheel weight for mounting to wheels of an industrial vehicle for counterbalancing the vehicle and/or for adding weight for traction purposes to the wheels of a vehicle.

Another object of the invention is to provide an improved wheel weight for an industrial vehicle which is formed and shaped for fitting to multiple shapes of wheels, including wheels having both concave and convex wheel disks, and to wheels which have different lug patterns.

DETAILED DESCRIPTION

Figure 1:
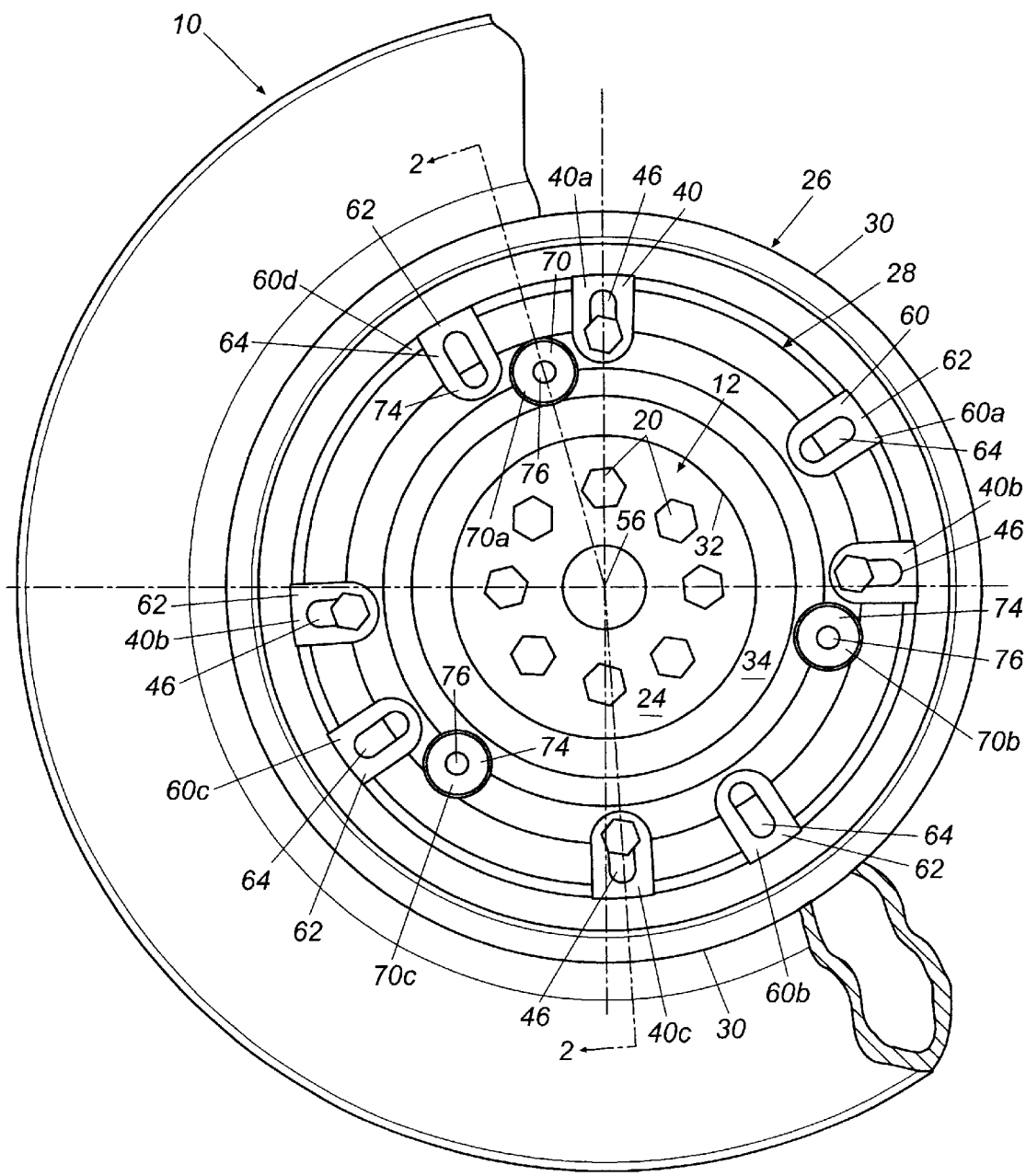
FIG. 1 is a side view of a wheel weight, showing a portion of a tire mounted to the rim of the wheel.

Referring now in more detail to the drawings, in which like numerals indicate like parts throughout the several views, FIG. 1 illustrates a vehicle wheel 10 that includes a wheel disk or rim 12, with an inflatable tire 14 mounted on the wheel disk. Details of the construction of the wheel disk and the inflatable tire are not disclosed herein, as they are considered to be conventional. However, it will be noted that the wheel disk 12 has a convex surface 16 and a concave surface 18. Generally, a reason for having opposed convex and concave surfaces is so that the wheel, particularly the tire 14, is reversible so as to place the tire closer to or farther from the vehicle, so as to have the tracks made by the tire positioned between rows of crops, or to have the wheels of the vehicle provide for lateral stability for the vehicle. Lugs 20 extend through openings 22 of the wheel disk 12 for mounting the wheel on the hub 24 of the vehicle.

Figure 2:
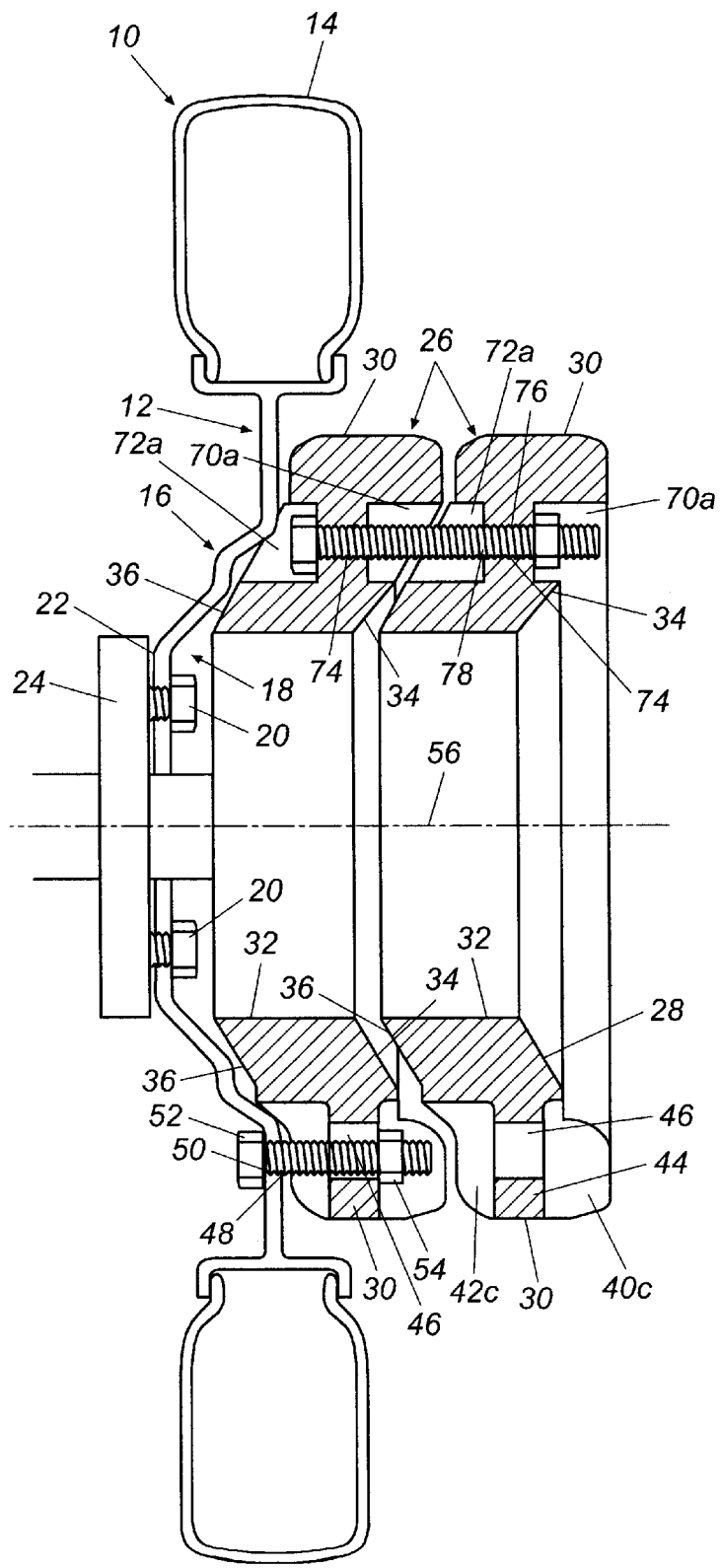
FIG. 2 is a side elevational view, in cross section, along lines 2—2 of FIG. 1, of a pair of nested wheel weights which are attached to a convex surface of a wheel disk of a wheel.
Figure 3:
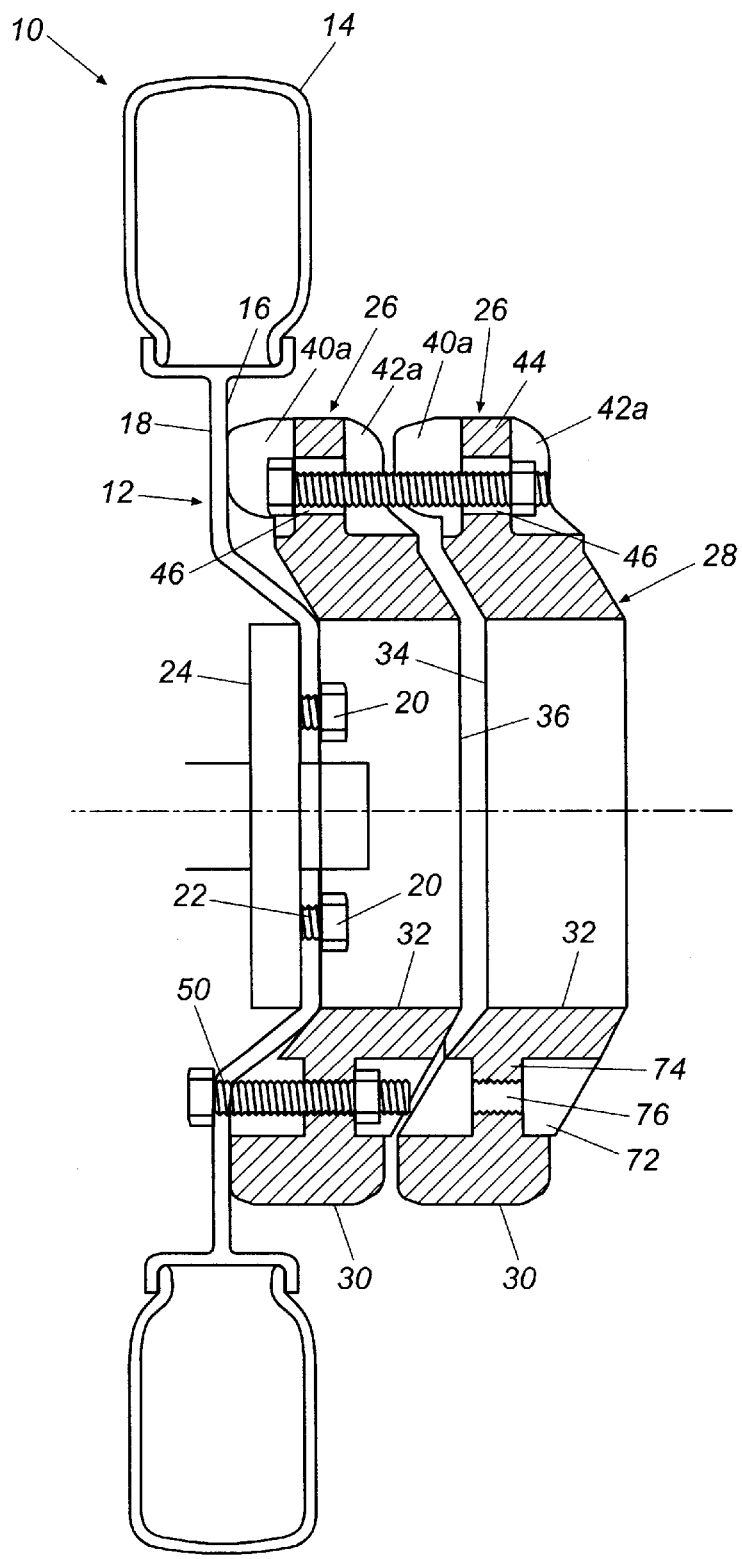
FIG. 3 is a side cross sectional view, similar to FIG. 2, but showing similar wheel weights attached to a concave surface of the wheel disk of a wheel.

Reversible wheel weights 26 are mounted directly to the wheel disks 12. As shown in FIGS. 2 and 3, multiple ones of the reversible wheel weights can be mounted to a single wheel, either to the concave side thereof (FIG. 2) or to the convex side (FIG. 3).

Wheel weights 26 each include an annular wheel weight body 28 which defines an outer annular peripheral surface 30 and an inner annular peripheral surface 32, and opposed concave side surface 34 and convex side surface 36. The inner annular peripheral surface 32 is of a diameter large enough to expose and permit access to lugs 20, so that the entire wheel assembly, including the wheel and the wheel weights can be mounted as a unit on or removed as a unit from the hub 24 of the vehicle.

As illustrated in FIG. 1, the wheel weight body 28 defines a first series of slots 40, which includes slots 40A, 40B, 40C and 40D which are formed on one side of the wheel weight body 28, with the slots being positioned at 90° intervals circumferentially about the annular wheel weight body, and with slots intersecting the outer annular peripheral surface 30 of the wheel weight body. As shown in FIG. 2, similar slots, such as slot 42C, are formed on the opposite, convex surface of the wheel weight body, with the slots, such as 42C, being aligned with slots 40A–40D. The slots 42 also intersect the annular outer peripheral surface 30 of the wheel weight body. Intermediate partitions 44 are formed at the periphery of the annular wheel weight body 28 by the opposed slots 40 and 42, and a bolt hole 46 is formed through each partition 44. The arrangement of the slots 40 and 42, the intermediate partitions 44 and bolt holes 46 is such that the threaded shaft of bolts 48 can be inserted through the bolt holes 46 and aligned with bolt openings 50 of the wheel disk, with the head 52 of the bolt and nut 54 holding the reversible wheel weight 26 to the wheel disk 12. Since the nut 54 or, if the bolt is reversed, the head 52 is recessed from the concave side surface 34 of the reversible wheel weight, thereby protecting the nut or head from inadvertent contact with obstructions adjacent the wheel weight.

It will be noted that the bolt holes 46 of the reversible wheel weight 26 is oblong, thereby permitting the bolt holes to align with wheel disk bolt opening 50 that might be of varying radial distances from the axis 56 of the wheel disk 12 and the axis 56 of the annular wheel weight bodies 26.

The second series of slots 60 are formed in the perimeter of the reversible wheel weights 26. Like the first series of slots 40, the second series of slots 60 include slots 60A, 60B, 60C, and 60D. Similar peripheral slots are positioned on the opposite, convex surface of the reversible wheel weights, with the similar slots aligned with the slots 60A–60D. Partitions 62 are formed between the slots and the partitions define bolt holes 64 for the passage therethrough of bolts. The slots 60, partitions 62, and bolt holes 64 can be utilized to connect adjacent ones of the reversible wheel weights 26 together, if desired, by inserting bolts through the aligned bolt holes of adjacent, nested, reversible wheel weights 26.

A series of bores 70 is formed in the reversible wheel weights 26, such as bores 70A, 70B, and 70C that are formed in the concave surface of the reversible wheel weights 26, and similar bores, such as bore 72A, are formed in the opposite, convex surface of the reversible wheel weights. The bores 70 and 72 are aligned with one another, and a partition 74 is formed. The partitions 74 define a bolt hole 76 for receiving a connector bolt, such as bolt 78.

The bores 70 are formed at 120° intervals circumferentially around the reversible wheel weights 26 and provide not only connection means for connecting adjacent wheel weights together as shown in FIGS. 2 and 3, but also provide means for connecting the wheel weights directly to the wheel disks 12, as shown in FIG. 3. Likewise, the bolts 48 which extend through the slots 42 can be used to mount the wheel weights together in their nested arrangement of FIG. 3.

As shown in FIGS. 2 and 3, the wheel weights can be nested together and mounted to either the convex surface of the wheel disks (FIG. 3) or to the concave surface of the wheel disks (FIG. 2), and when in either situation, the wheel weights are firmly and expediently mounted to the wheel disks, without obstructing the lugs 20 of the wheel disks, and without exposing the connector bolts 48 and 70 beyond the slots or bores of the wheel weight bodies, thereby shielding the bolts from obstruction from outside obstacles. Indeed, the entire wheel assembly can be mounted to and dismounted from the hub 24 of the vehicle, without separating the reversible wheel weights 26 from the wheel disks or from each other. Further, the reversible wheel weights can be mounted as shown in FIGS. 2 and 3, in their nested relationship, prior to or after they have been mounted to the wheel disks. With this arrangement, the vehicle operator can selectively add and subtract wheel weights from the wheels of the vehicle without being required to remove all of the wheel weights. Also, the concave and convex surfaces of the wheel weights tend to fit in or about the convex or concave surfaces of a wheel disk, which helps the installer initially hold the wheel weight in place on the wheel disk when the wheel weight is being mounted to a wheel.

While bolts have been described as the connector means which connect the wheel weights together, other types of connectors can be utilized, as may be obvious. For example, the circular bolt holes 76 of the bores 70 can be internally threaded so as to directly received threads of a screw without requiring a nut to be threaded on the end of the screw to form a complete bolt. Likewise, the wheel disk bolt openings 50 can be internally threaded, so that a screw can be threaded to it for holding a wheel weight in its mounted position adjacent the wheel disk of the vehicle.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A wheel weight for an industrial vehicle, the industrial vehicle having opposed first and second ends and wheels at each end, said wheel weight adapted for mounting to a wheel at the first end of the industrial vehicle and counter balancing the second end of the industrial vehicle, comprising:

a wheel weight body formed in the shape of an annulus, defining a central axis, an annular inner rim, an annular peripheral surface, and opposed first and second lateral surfaces, said first lateral surface being convex and said second lateral surface being concave, said first and second lateral surfaces being shaped for nesting with duplicate ones of said wheel weight body;

a first series of slots intersecting said annular peripheral surface of said wheel weight body and formed in both said first and second opposed surfaces of said body and positioned at 90 degree intervals about said body and at equal radial distances from said axis, each of said slots in said first surface in alignment with one of said slots in said second surface and intermediate partitions formed between said slots of said first and second surfaces, with connector openings formed in said intermediate partitions of said slots;

a second series of slots positioned about said body as said first series of slots, said second series of slots being circumferentially offset by 30 degrees from said first series of slots, intermediate partitions formed between aligned ones of said slots of said second series of slots, and connector openings formed in said partitions of said second series of slots; and a series of bores formed in both said first and second opposed surfaces of said body and positioned at 120 degree intervals about said body and at equal radial distances from said axis and positioned radially inwardly of said slots, each of said bores in said first surface in alignment with one of said bores of said second surface and intermediate partitions formed between aligned ones of said bores of said first surface and said bores of said second surface, with connector openings formed in said intermediate partitions of said bores, all of said bores being circumferentially offset from all of said slots;

whereby duplicate ones of said wheel weight body can be nested with a convex lateral surface of one wheel weight body facing the concave lateral surface of an adjacent duplicate wheel weight body and connectors extending between the nested duplicate wheel weight bodies to hold the duplicate wheel weight bodies nested, and connectors extending from one of said wheel weight body for extending to the disk of a wheel of the industrial vehicle for mounting the nested wheel weight bodies to a wheel of the industrial vehicle.

2. A wheel weight for an industrial vehicle, the industrial vehicle having opposed first and second ends and wheels at each end, said wheel weight adapted for mounting to a wheel at the first end of the industrial vehicle and counter balancing the second end of the industrial vehicle, with the wheel of the industrial vehicle having either a convex or concave laterally extending wheel disk, comprising:

a weight body formed in the shape of an annulus, defining a central axis, an annular inner rim, an annular peripheral surface, and opposed first and second lateral surfaces, said first lateral surface being convex and said second lateral surface being concave, said first and second lateral surfaces being shaped for nesting with duplicate ones of said weight body and with either of the convex or concave laterally extending wheel disk of a wheel;

connector openings formed in said weight body for connecting said weight body to a wheel disk of a wheel, said connector openings arranged to correspond to the lug positions of a wheel; and said weight body defining slots on both the first and second lateral surfaces about said connector openings for receiving bolts recessed in said weight body and holding duplicate ones of said weight body in a nested relationship.

\* \* \* \* \*